(12) United States Patent
Boritzki

(10) Patent No.: US 8,976,907 B2
(45) Date of Patent: Mar. 10, 2015

(54) BIT SYNCHRONIZER FOR DETECTING SYMBOL TIMING ERROR FOR HIGH ORDER MODULATION USING A TRAJECTORY MID-POINT ROTATION AND RELATED METHODS

(71) Applicant: Harris Corporation, Melbourne, FL (US)

(72) Inventor: Daniel Boritzki, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 99 days.

(21) Appl. No.: 13/743,584

(22) Filed: Jan. 17, 2013

(65) Prior Publication Data

US 2014/0198834 A1    Jul. 17, 2014

(51) Int. Cl.
*H04L 27/06* (2006.01)
*H04L 7/00* (2006.01)

(52) U.S. Cl.
CPC .................................. *H04L 7/0079* (2013.01)
USPC ........................................................ 375/340

(58) Field of Classification Search
CPC ............. H04L 27/2647; H04L 5/0007; H04N 21/2383
USPC ........................................................ 375/340
See application file for complete search history.

(56) References Cited

U.S. PATENT DOCUMENTS

| 5,052,026 A | 9/1991 | Walley |
| 5,282,228 A | 1/1994 | Scott et al. |
| 5,694,417 A | 12/1997 | Andren et al. |
| 6,381,291 B1 | 4/2002 | Yom |
| 6,384,780 B2 | 5/2002 | Walley et al. |
| 6,996,193 B2 | 2/2006 | Yamagata et al. |
| 7,469,027 B2 | 12/2008 | Liu et al. |
| 7,539,251 B2 | 5/2009 | Boritzki et al. |
| 7,539,252 B2 | 5/2009 | Boritzki et al. |
| 2007/0183548 A1* | 8/2007 | Kanazashi ..................... 375/368 |
| 2009/0135799 A1 | 5/2009 | McPherson et al. |
| 2010/0135316 A1* | 6/2010 | Atungsiri et al. ............. 370/436 |

OTHER PUBLICATIONS

Gappmair et al., "Extended Gardner Detector for Improved Symbol-Timing Recovery of M-PSK Signals," IEEE Transactions on Communications, vol. 54, No. 11, Nov. 2006, pp. 1923-1927.
Lindsey, "Bit Synchronization System Performance Characterization, Modeling, and Trade-Off Study," Technical Publication TP-73-18, AIR TASK A5355352-054E-3F09905003, University of Southern California. Sep. 4, 1973, 90 pages.

* cited by examiner

*Primary Examiner* — Tanmay Shah
(74) *Attorney, Agent, or Firm* — Allen, Dyer, Doppelt, Milbrath & Gilchrist, P.A.

(57) ABSTRACT

A communications device includes an input that receives a communications signal having in-phase (I) and Quadrature (Q) signal components. A bit synchronization circuit detects the symbol timing error in the communications signal and includes a symbol mapper circuit configured to receive I and Q signal components and determine transition samples of vectors within the signal constellation. A rotation generator circuit is coupled to the symbol mapper circuit and configured to rotate the trajectory of the transition samples at their mid-points to determine the symbol timing error.

24 Claims, 13 Drawing Sheets

DIGITAL DATA TRANSITION TRACKING LOOP

GENERIC DECISION DIRECTED TIMING DETECTOR (DDTD) FOR NRZ DATA

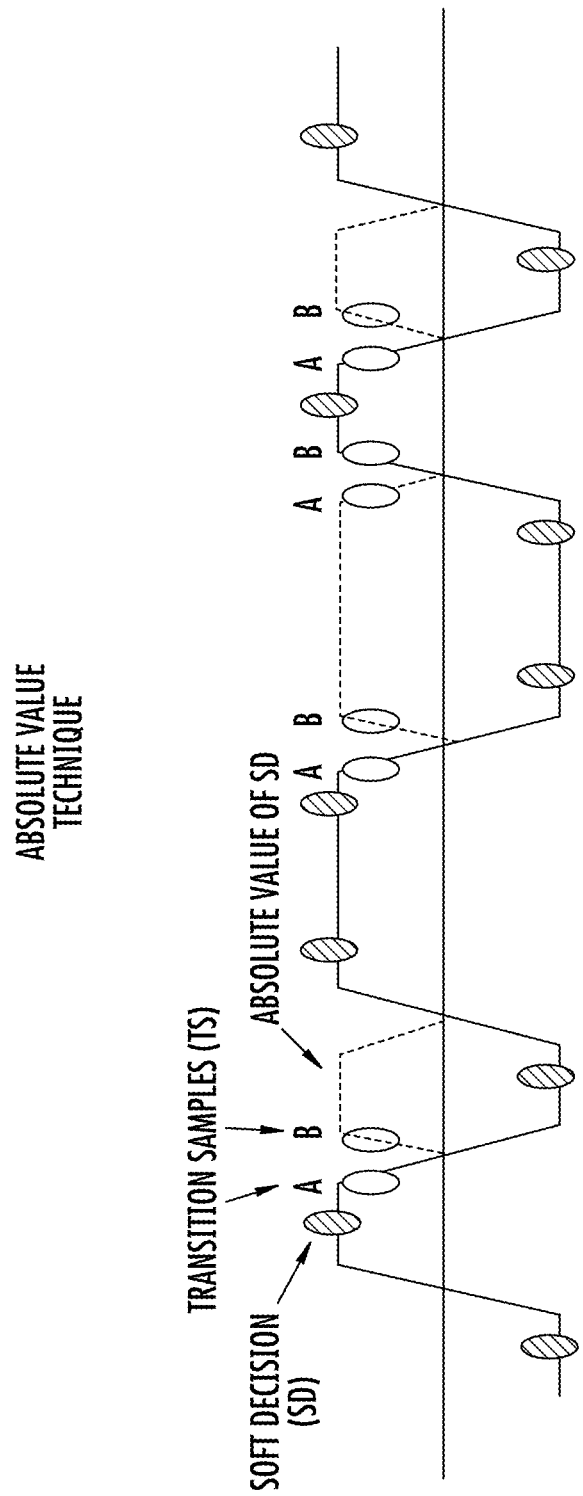

MID POINT VECTORS WILL BE ROTATED PARALLEL TO THE IMAGINARY AXIS (IF POSSIBLE)
MID POINT VECTORS

ROTATED 45 DEG.

ROTATED MID POINT VECTOR TO IMAGINARY AXIS

ROTATED MID POINT TO IMAGINARY AXIS

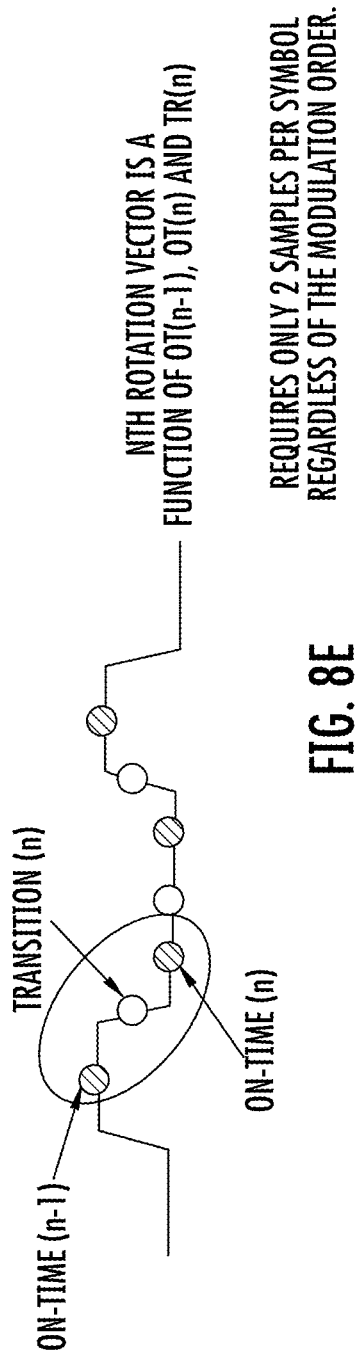

| | SLOPE NEAR ZERO CROSSING | | | |
|---|---|---|---|---|
| | 100 dB | 10 dB | 6 dB | 3 dB |
| BPSK | 1.5925 | 1.4973 | 1.5595 | 1.0688 |
| QPSK | 1.5938 | 1.5797 | 1.1164 | 0.7495 |
| 8-PSK | 1.6436 | 1.1125 | 0.6647 | 0.5017 |

BIT SYNCHRONIZER FOR DETECTING SYMBOL TIMING ERROR FOR HIGH ORDER MODULATION USING A TRAJECTORY MID-POINT ROTATION AND RELATED METHODS

FIELD OF THE INVENTION

The present invention relates to the field of communications, and more particularly, the present invention is directed to a bit synchronization and detecting symbol timing error in a received communications signal.

BACKGROUND OF THE INVENTION

Digital receivers require circuits that determine the symbol timing error and the carrier phase or frequency error. Typically in a digital communications system, the output of a demodulator is sampled periodically about once per symbol interval to recover transmitted information. Because the propagation delay from a transmitter to the receiver is unknown at the receiver, the symbol timing is derived from the received signal to sample synchronously an output of the demodulator. The propagation delay in a transmitted signal often creates a carrier offset that must be estimated if a detector is phase-coherent. Any signals transmitted through the communications channel delays those signals and corrupts them by adding Gaussian noise. Symbol synchronization and carrier recovery are required if the signal is detected coherently.

Demodulation requires that any propagation delays be determined. The precision required to synchronize in time to demodulate this received signal often depends on the symbol interval, which is also dependent on the time delay. Different criteria that apply to signal parameter estimation used in demodulation include the maximum-likelihood (ML) criterion and the maximum a posteriori probability (MAP) criterion. With the ML estimation, an observation interval is used as the received signal over a time interval and estimation is performed on a continuous basis, using tracking loops that update estimates. The carrier phase can be estimated using pilot signals as known to those skilled in the art. A phase-locked loop (PLL) is used to acquire and track the carrier component. In other techniques, the carrier phase estimate is derived directly from the modulated signal. That technique has the advantage that the total transmitter power is allocated to the transmission of the information-bearing signal.

Decision-directed loops are often used to estimate phase as known to those skilled in the art. Typically it can be assumed that the information sequence over an observation interval has been estimated using a decision-directed parameter estimation. Non-decision-directed loops also are known and used. Timing recovery often is accomplished using a square-law device and a Costas loop, as known to those skilled in the art.

In these digital communication systems, the demodulator output is sampled periodically at precise sampling time instants to obtain a symbol timing estimation and determine a clock signal at the receiver. Extracting a clock signal is known as symbol synchronization or timing recovery. In one known technique, a receiver circuit determines the frequency at which outputs of matched filters or correlators are sampled, but also determines where to take the samples within each symbol interval. The choice of the sampling instant is typically known as the timing phase.

A Decision Directed Timing Detector (DDTD) can be used similar to the "Digital Data Transition Loop" (DTTL) by Lindsey as set forth in his article Technical Publication TP-73-18, Bit Synchronization System Performance Characterization, Modeling, and Tradeoff Study (Airtask A5355352-054E-3F09905003), W. C. Lindsey, University of Southern California, Sep. 4, 1973, the disclosure which is hereby incorporated by reference in its entirety. When there is no transition a zero is sent as the error. When a transition occurs the transition sample is used to determine the error term. This technique works for low order modulations like BPSk and QPSK and only requires two samples per symbol. A non-decision-directed timing estimation can also be used. Often correlators are used in place of equivalent matched filters with two correlators integrating over a symbol interval and an error signal formed by taking the difference between the absolute values of two correlator outputs.

A well known technique and timing recovery loop is an all-digital timing recovery loop that also includes a Gardner timing recovery algorithm. It is in widespread use and uses two samples per symbol. A Gardner timing recovery circuit recovers the symbol timing phase of the input signal using Gardner's method. This circuit implements a non-data-aided feedback method that is independent of carrier phase recovery. The timing error detector that forms part of the circuit's algorithm requires at least two samples per symbol, one of which is the point at which the decision can be made. The recovery method estimates the symbol timing phase offset for each incoming symbol and outputs the signal value corresponding to the estimated symbol sampling instant. The second output returns the estimated timing phase recovery offset for each symbol, which is a non-negative real number less than N, where N is the number of samples per symbol. The error update gain parameter is the step size used for updating the successive phase estimates.

Insensitive to carrier offsets, the timing recovery loop can lock first, therefore, simplifying the task of carrier recovery. Error for the Gardner algorithm is computed using the following equation:

$$e_n = (y_n - y_{n-2})y_{n-1}$$

where the spacing between $y_n$ and $y_{n-2}$ is T seconds and the spacing between $y_n$ and $y_{n-1}$ is T/2 seconds.

The sign of the Gardner error can be used to determine whether the sampling is correct, late or early. Gardner error is most useful on symbol transitions. A description of the Gardner timing recovery algorithm is given in the article: Gardner, F. M., "A BPSK/QPSK Timing-Error Detector for Sampled Receivers," IEEE Transactions on Communications, Vol. COM-34, No. 5, May 1986, pp. 423-429, the disclosure which is hereby incorporated by reference in its entirety.

In some instances with higher order modulations, transitions from one constellation point to the next may not be parallel with either a real or imaginary axis. As a result, some traditional symbol tracking detectors rely on the absolute value of a highly oversampled signal. Often the lower level modulations will use only two samples per symbol and it is desirable to leverage existing signal process and functions to provide symbol tracking with higher order modulations.

SUMMARY OF THE INVENTION

A communications device includes an input that receives a communications signal having in-phase (I) and Quadrature (Q) signal components. A bit synchronization circuit detects the symbol timing error in the communications signal and includes a symbol mapper circuit configured to receive I and Q signal components and determine transition samples of vectors within the signal constellation. A rotation generator circuit is coupled to the symbol mapper circuit and configured to rotate the trajectory of the transition samples at their midpoints to determine the symbol timing error.

BRIEF DESCRIPTION OF THE DRAWINGS

FIG. 3 is a graph of transition samples showing an absolute value approach as commonly used in some BSS.

FIG. 8E shows the graph of a transition.

DETAILED DESCRIPTION OF THE PREFERRED EMBODIMENTS

Figure 1:
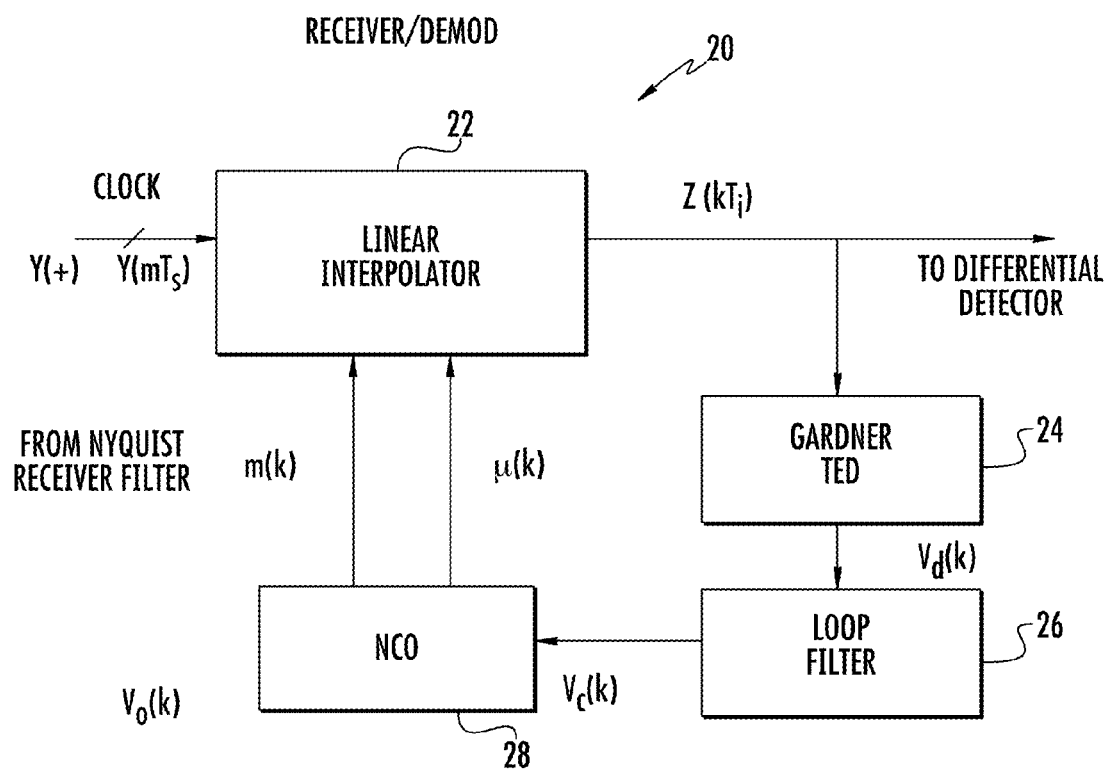
FIG. 1 is a block diagram showing a prior art example of an all-digital, symbol timing recovery circuit that recovers the symbol timing using a linear interpolator and the Gardner timing error detector (TED).

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

It should be appreciated by one skilled in the art that the system, communications device, methodology and techniques as described are not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication and satellite communications. Applications may involve point-to-point communication, point-to-multipoint communication, broadcasting, cellular networks and other wireless networks.

The technique as described provides a bit synchronizer and symbol timing error detector for high order modulation using trajectory mid-point rotation. This technique provides a compact and elegant single form solution for derivation of symbol timing error for any order modulation using the trajectory mid-point rotation in only two samples per symbol. The disclosed technique is a simple design and uses the mid-point of the ideal or other derived trajectory to provide a rotational vector and create a symbol timing error measurement for any high order modulation. One example uses a simple and compact logic based circuit design using a gate array that works for Binary Phase Shift Keying (BPSK) through 8-PSK (phase shift keying) and can be readily extended to higher order modulations.

In current state of the art, communications systems for higher order modulations oversample beyond two samples a symbol. That technique has been the status quo but technology advancements have resulted in better and faster field programmable gate arrays (FPGA's) that use higher order modulations in newer military modems and this technical problem had to be addressed. The prior art systems were typically acceptable for previous legacy designs and were targeted at specific modulations.

Currently there is a need for a general purpose field programmable gate array based on software defined radio technologies that covers multiple waveforms within the same design. Higher order modulations have always been a problem when demodulating and processing because they required oversampling or an equalizer that resulted in reductions in symbol rate and/or performance. The disclosed system and method explained below allows for higher rates without increasing the sample rate and improving the performance, while reducing size and power. The same design can be easily tailored to nearly any modulation, while maintaining two samples for a symbol. It is typically immune to normalization when compared to legacy approaches. The phase detector has various characteristics and can be generated using random data as adjusted for the average transition density. The peak is not typically dramatically important, but rather the slope of the curves near zero. The complex rotation vectors can be scaled to match the slopes of different modulation orders if they are close already.

It should be understood that two basic functions of a coherent PSK demodulator are carrier phase and symbol timing recovery and the technique as described combines a generic carrier phase error detection circuit with a new symbol timing error detector that is applicable to any higher order modulation. The same symbol timing logic can be used for BPSK, QPSK, and 8-PSK, but can be expanded to include any higher order modulation. It can also be applied to other modulations in addition to PSK. This trajectory mid-point timing detector allows higher order modulation symbol tracking with only two samples per symbol.

There now follows a brief description of basic elements of timing and carrier recovery in a receiver, which typically includes a receiver loop and provides automatic gain control (AGC), timing recovery, carrier recovery and channel equalization. Timing recovery typically includes a timing recovery loop with various type of timing recovery circuits including early-late gate, Mueller and Muller, and Gardner algorithms. Carrier recovery includes phase locked loops with a phase detector and loop filter or Costas loop and carrier recovery algorithms.

The technique as described is a data-derived technique of bit synchronizing and uses no pilot frequency that would add an extra signal to the frequency domain. In the data-derived technique, a receiver obtains the bit-synchronized clock directly from the received signal and requires no extra energy in any extra frequency spectrum. The receiver finds the beginning and the end of the bits (symbols) and decides where the middle of the symbol is located to detect data correctly because the rise and fall edge of symbols are distorted. The receiver generates the local synchronized clock that works at the same frequency as the transmitter clock with the whole process known as bit synchronization.

Automatic Gain Control (AGC) scales to a known power level and is accomplished typically in the analog domain. If the received signal strength is high, clipping occurs and if the received signal is low, distortion occurs because of quantization. The timing recovery loop obtains symbol synchronization and requires a determined sampling frequency that estimates the symbol period and a sampling phase to determine the correct time within a symbol period to take a sample. Typically, the transmitter oscillator generates a sinusoidal carrier signal that exists at a known carrier frequency. At the receiver the passband signal is multiplied by the sinusoid generated from the local oscillator. Any frequency offset can cause a received signal constellation to rotate. This rotation should be removed before accurate symbol decisions are made. The carrier recovery loop employed in most receivers removes the frequency offset and processes the signal at baseband. The receiver often includes an equalizer as an adaptive filter to remove intersymbol interference by correcting for the effects of the channel.

The processor at the receiver must determine a sample frequency and where it takes samples within each symbol interval since it initially has no knowledge of the precise arrival times of pulses. The timing recovery includes a timing measurement to estimate the timing error using standard algorithms and a timing correction that adjusts the timing phase of a voltage or numerically controlled oscillator or uses a polyphase rate change filter or adjusts the received filter.

FIG. 1 illustrates at 20 a digital symbol timing recovery circuit such as part of a receiver and demodulator that uses using the Gardner algorithm to detect symbol error. The circuit 20 includes a linear interpolator 22 and a Gardner Timing Error Detector (TED) 24 followed by a digital loop filter 26 and Numerically Controlled Oscillator (NCO) 28. This circuit 20 is a feedback timing error synchronizer that operates similar to a phase-locked loop (PLL). The linear interpolator 22 computes intermediate values between adjacent signal samples and can generate the samples in between those actually sampled by an analog/digital converter and thus interpolate. Using these intermediate samples, the interpolator 22 can adjust the effective sampling frequency and phase with an interpolated signal as a smooth version of the original signal containing n times as many samples. The linear interpolator 22 can be designed using Finite Impulse Response (FIR) filters. The Gardner TED 24 compares the received waveform with a locally generated signal in every symbol. Phase and frequency offsets can occur in which frequency offsets are caused by a difference in the sampling rate of a transmitter and receiver. This can be also be caused by Doppler shift. A loop filter can be used to track out phase and frequency errors, using a proportional plus integral (PI) configuration. A closed loop transfer function can have a stable second degree transfer function and track out phase and frequency offsets. The Numerically Controlled Oscillator (NCO) controls an estimated timing of the loop.

Match filtering can provide a receiver with a stronger signal compared to sampling directly with a received filter. A standard second-order loop filter can be used as a control signal for the interpolator. Some early-late gate algorithms can be used as well as Mueller and Muller algorithms that require one sample per symbol. The Gardner algorithm is in widespread use and uses two samples per symbol. It is typically insensitive to carrier offsets and allows the timing recovery loop to lock first and simplify carrier recovery. Typically, the Gardner timing recovery circuit recovers the symbol timing phase of the input signal and incorporates a non-data-aided feedback independent of carrier phase recovery. The timing error detector requires at least two samples per symbol, one of which is the point at which a decision is made. This recovery technique estimates the symbol timing phase offset for each incoming symbol and outputs the signal value corresponding to the estimated symbol sampling instant. A second output returns the estimated timing phase recovery offset for each symbol, which is a non-negative real number less than "n" where "n" is the number of samples per symbol. The error update gain parameter is used for updating the successive phase estimates.

In another type of timing recovery, the transmitter and receiver operate off the same clock. As an alternative, the clock frequency is transmitted along with the data. Carrier recovery typically includes estimating carrier synchronization parameters as a carrier frequency offset and a carrier phase offset as phase instability and oscillator. A carrier-recovery loop can use a phase locked loop with a training signal and carrier frequency and phase. Also, feed forward digital carrier recovery techniques can be used. Phase locking the output phase of an oscillator voltage is aligned with the phase of the reference voltage. Phase locking is achieved by changing the frequency of the oscillator momentarily while comparing phases of the oscillator and reference signals. The phase detector generates the error signal that drives the phase locked loop and could be a sinusoidal or quadrature phase detector.

A loop filter filters the phase error signal to provide a better signal to the voltage or numerically controlled oscillator. A gain parameter is chosen for a loop filter to control the loop bandwidth of the phase locked loop. In an all-digital receiver, the digital phase locked loop is used and typically uses a second order loop filter with the VCO replacing the Direct Digital Synthesizer (DDS). The phase detector is implemented using an arc-tan functional circuit.

At the start of a carrier recovery process, symbol synchronization is achieved. Symbol timing is determined without knowledge of the carrier phase or frequency variation/offset. The output of a symbol decoder is fed to a comparison circuit and the phase difference/error between the decoded symbol and a received signal disciplines the local oscillator. Decision directed techniques can be used for synchronizing frequency differences that are less than the symbol rate because comparisons are performed on symbols at or near the symbol rate. Other frequency recovery techniques can achieve initial frequency acquisition. One type of decision directed carrier recovery begins with a quadrature phase correlator that produces in-phase and quadrature signals that represent a symbol coordinate in the complex plane. This point can correspond to a location in a modulation constellation diagram. For example, an arc tangent circuit calculates the phase error between a received value and a nearest/decoded symbol. A slicer as a clipper circuit (or limiter) quantizes the received symbol to a nearest constellation point. That quantized symbol is used as an estimate of the actual transmitted symbol. Thus, the inverse tangent finds the difference between the received phase of samples and the phase of a slicer's output. Often an inverse tangent look-up table is used in hardware, but other methods can be used to avoid implementing the inverse tangent look-up table in hardware.

The disclosed technique, in accordance with a non-limiting example, addresses the two basic functions of a coherent PSK Demodulator, i.e., its carrier phase and symbol timing recovery. This technique as noted before combines the generic carrier phase error detection circuit with a new type of symbol timing error detector and works with any higher order modulation. In this technique, the same symbol timing logic is used for BPSK, QPSK, and 8-PSK and can be expanded to include any high order modulation. It can be applied to other modulations in addition to the PSK and is described as a trajectory mid-point directed timing detector. It allows higher order modulation symbol tracking with only two samples per symbol.

Figure 2A:
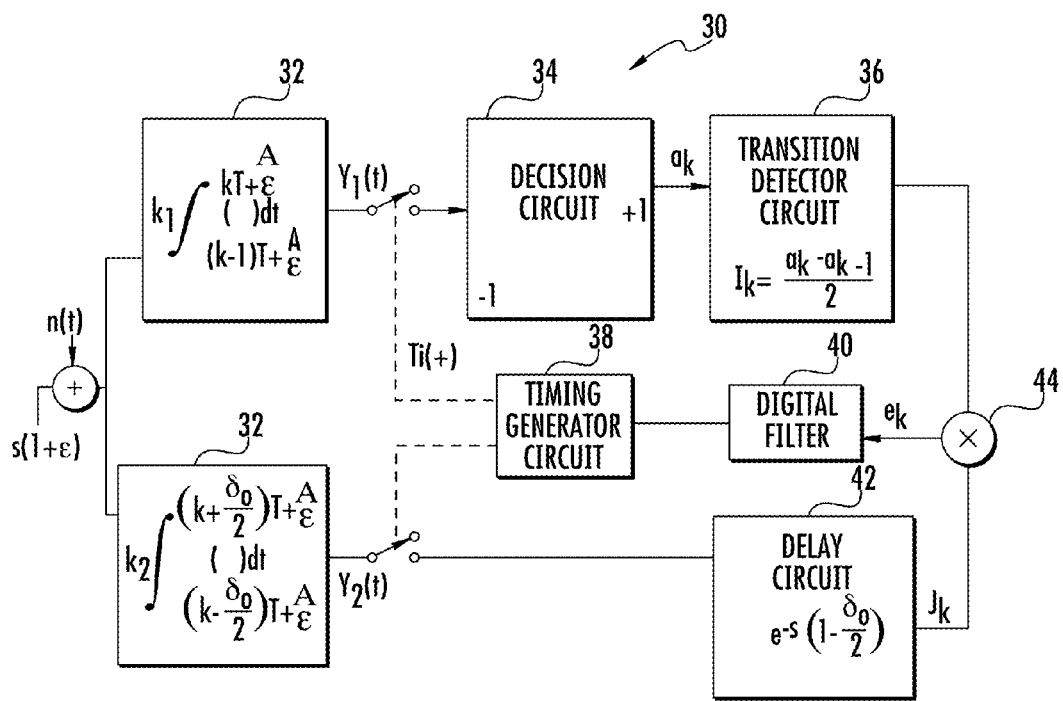
FIG. 2A is a block diagram of a prior art digital data transition tracking loop (DDTL) that works with a bit synchronizer system (BSS) that incorporates a decision-directed timing detector.

FIG. 2A illustrates a bit synchronization system (BSS) 30 operative as a digital data transition tracking loop (DTTL). The system includes two parallel integrator circuits 32 that receive the input signal, a decision circuit 34, a transition detector circuit 36, timing generator circuit 38, digital filter 40 and delay circuit 42. A mixer 44 receives signals from the transition detector circuit and delay circuit and inputs them into the digital filter. This digital data transition tracking loop (DTTL) uses a decision feedback and an error channel in which the "window" is used to improve tracking performance. The parameters are used to adjust the window width.

Figure 2B:
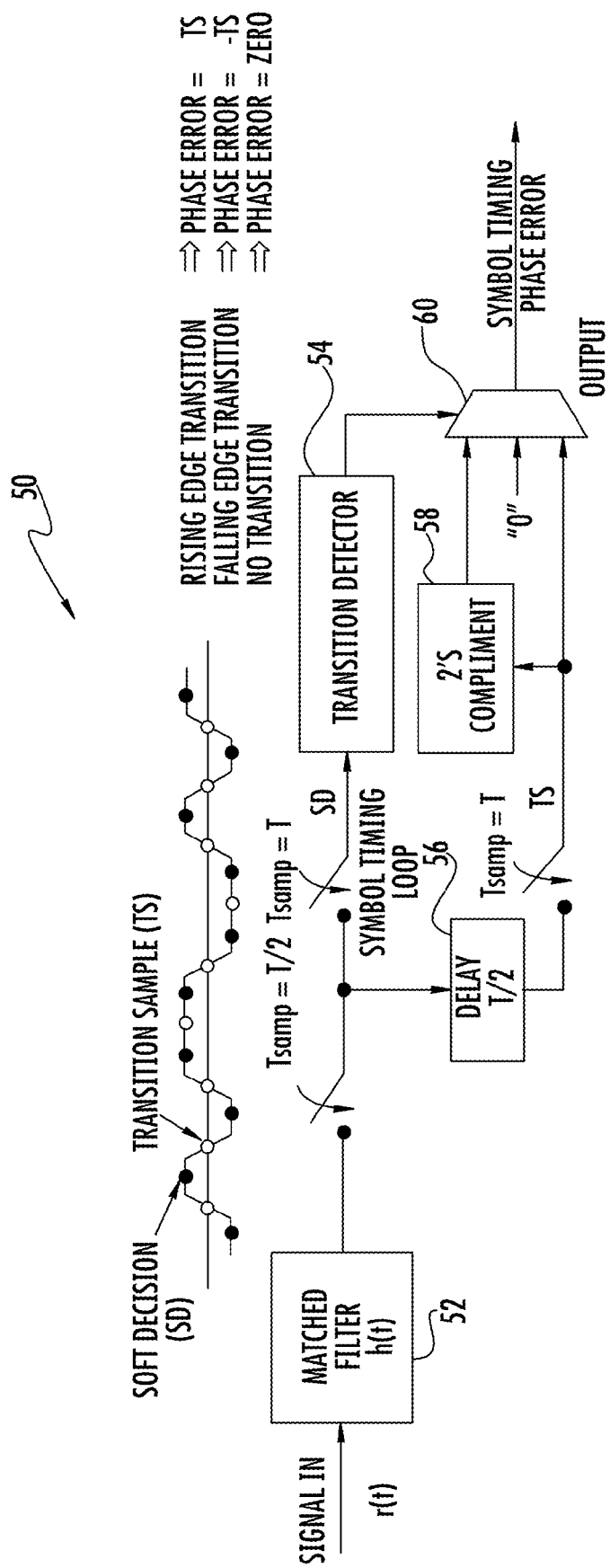
FIG. 2B is a block diagram of a prior art decision-directed timing detector (DDTD) as part of the DDTL in FIG. 2A.

FIG. 2B shows the decision directed symbol timing detector 50 that includes a matched filter 52 that receives the communications signal and the transition detector 54. A delay circuit is illustrated 56 and a two's (2's) compliment circuit 58. The symbol timing phase error is output through output 60.

This DDTD is used for BPSK and QPSK as an example. There are typically two samples per symbol coming from the matched filter 52 to the symbol timing loop. It is a generic Decision Directed Timing Detector (DDTD) for NRZ data in this example. As is known, the NRZ (non-return-to-zero) line code is a binary code in which the 1's are represented by a significant condition such as a positive voltage and 0 is represented by, for example, a negative voltage.

The DDTD 50 shown in FIG. 2B is part of a technique described by W. C. Lindsey in the above-identified technical publication TP-73-18. When there is no transition, a 0 is sent as the error. This requires that transition density be taken into account in the loop calculations. If by examining the sign of the soft decision (SD) a Rising Edge transition occurs, then the value of the Transition (TR) Sample is used as the phase error. If the transition represents a falling edge based on the sign bits of the soft decisions, then the transition sample is two's complimented to maintain the slope of the phase detector. For BPSK or QPSK, the transitions are always relative to either the real or imaginary axis. If there is noise, then the nominal normalized amplitude of the soft decisions is +/−A the phase detector gain (Dg) is represented by the slope of the phase detector curve and can be approximated as A/pi in a noise-free environment. In a noisy environment, the slope (kd) is reduced.

FIG. 3 shows a graph exhibiting an absolute value and showing the soft decision with the absolute value of SD. In this example, the absolute value is used to drive the loop until A=B. This requires more samples per symbol to get good resolution on A and B and generally can be used for higher order modulations.

In the case of higher order modulations, the transition from one constellation point to the next may not be in parallel with either the real or imaginary axis. As a result, the traditional Symbol Tracking detectors rely on the absolute value of a highly oversampled signal.

Figure 4:
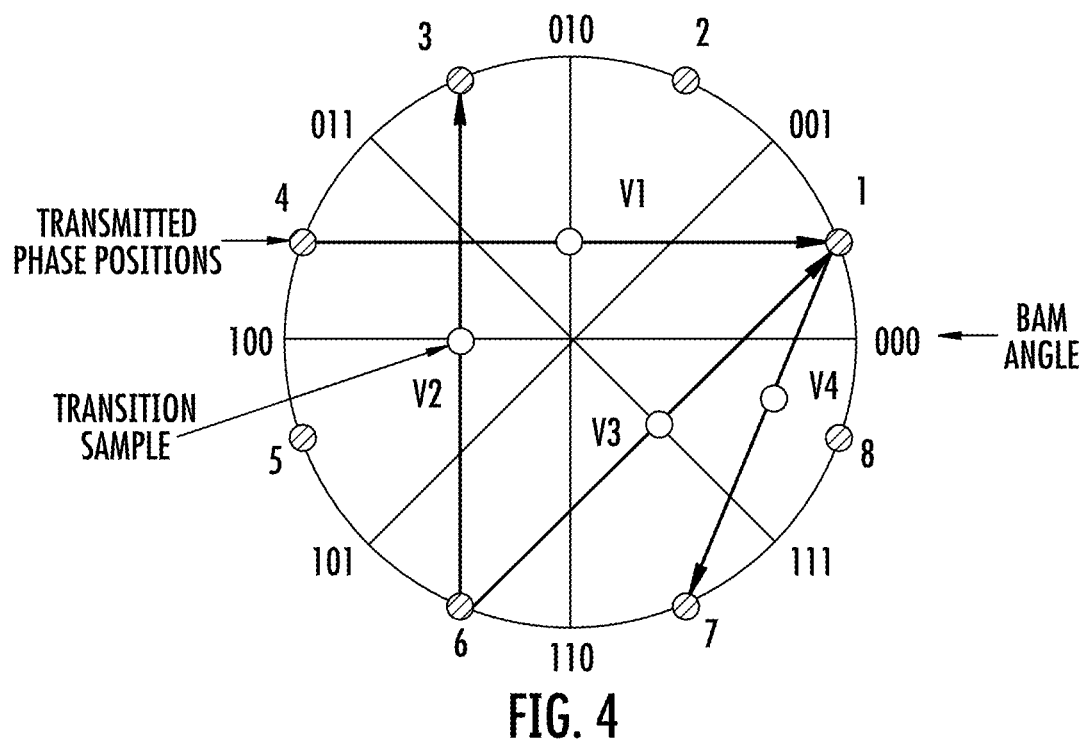
FIG. 4 is an 8-PSK constellation phase diagram showing the binary angular measurement (BAM) and showing the transmitted phase positions and transition sample in accordance with a non-limiting example.

The new technique, in accordance with a non-limiting example, uses the traditional two (2) samples per symbol similar to lower level modulation, while leveraging existing signal processing functions to provide symbol tracking. The instant technique rotates the trajectory such that it is in parallel with the real axis. The transition sample can be used as the timing error. An example 8-PSK constellation phase diagram is shown in FIG. 4 with some examples of trajectory vectors superimposed.

Binary Angular Measurement (BAM) is used to represent the relative phase angles. Only the most significant 3 bits of the BAM angle are shown on the 8-PSK diagram for this example. Vectors V1 and V2 both have trajectories that would allow a traditional DDTD to work as explained before, but in the case of Vector 3, the trajectory mid point is not perpendicular to either the I or Q axis. With the traditional design, it would be ignored. The BAM angle or hard decisions normally exists in most demodulators based on the received on-time sample. The technique as described uses the binary BAM angle/hard decisions that are grouped based on the particular modulation, which may be or may not be part of the carrier phase detector, and determines what the ideal trajectory should have been for a particular transition.

Figure 5A:
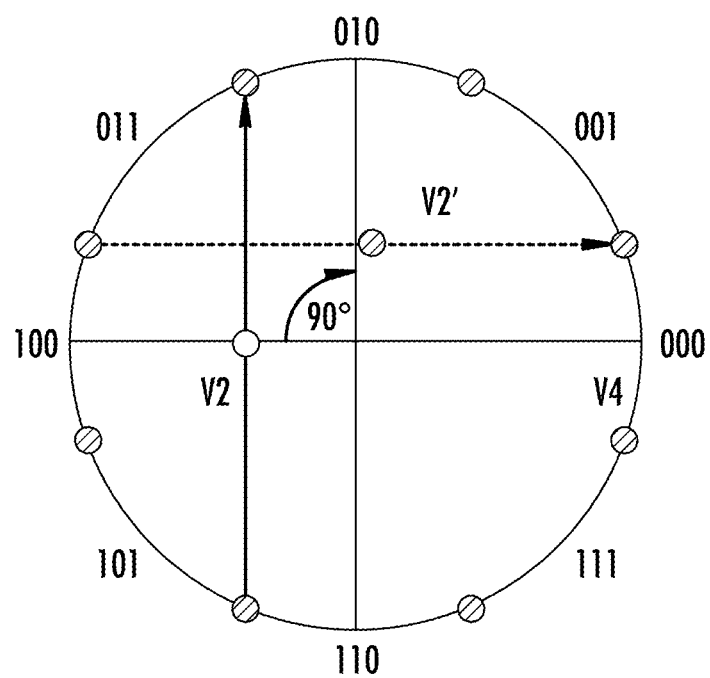
FIGS. 5A through 5C are constellation phase diagrams showing an example of the transition sample rotation in accordance with a non-limiting example.
Figure 5B:
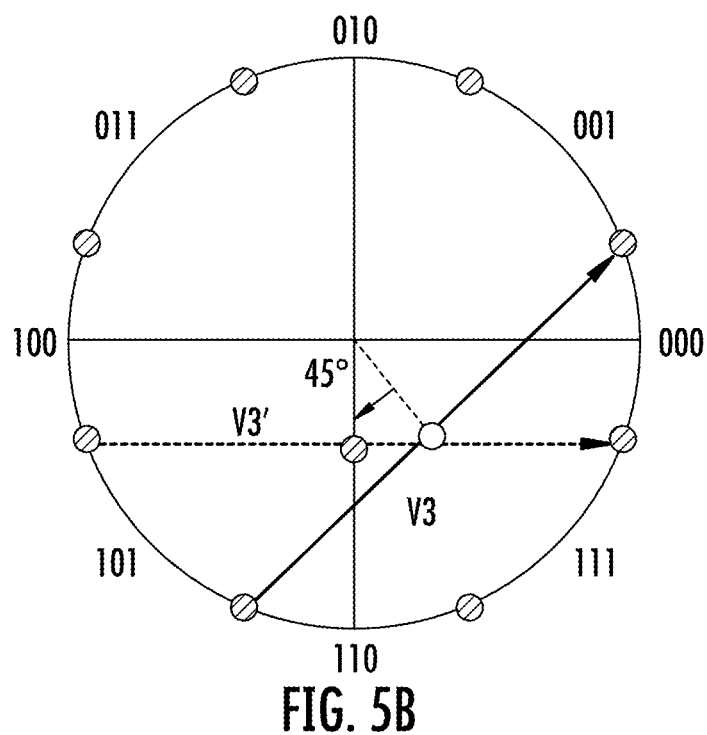
Figure 5C:
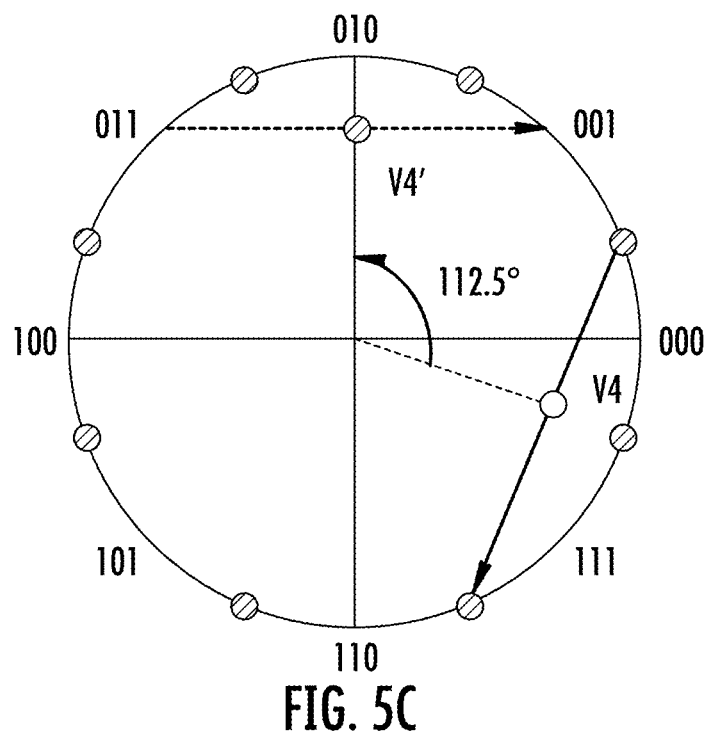

The circuit using this technique then rotates the coordinate axis to the appropriate angle through multiplication of a complex weight, such that the trajectory vector is parallel to the real axis in a positive direction. In the constellation diagram shown in FIG. 4 Vector V1 would require no rotation because it goes from left to right and parallel to the real axis. The transition sample in the middle would become similar to a BPSK transition in a DDTD. As shown in FIGS. 5A-5c, the other vectors would need to be rotated. The transition sample in the middle of V2 would be rotated 90 degrees clockwise and would result in a decision directed timing error term identical to V1. In the case of V3, the transitions sample would be rotated clockwise by 45 degrees so that V3' was parallel to the real axis and going from left to right. This general procedure would be performed on each transition vector and the resulting real portion of the vector becomes the timing error. V4 (FIG. 5C) would be rotated counterclockwise 112.5 degrees. A gain term may also be applied to the complex weight such that the phase detector gain would remain constant.

By using this rotation technique for higher order modulations, only two multiplications are required because only the real part of the transition sample is required to provide the needed timing error term. The rotations are such that it always appears similar to a BPSK rising edge transition, which requires no further manipulation to provide the appropriate error term. If a gain term is applied, based on the rotation selected, the variation in detector gain for short vectors (V4) and longer vectors (V1, V2, V3) can be normalized. Similar to a standard DDTD, when no transition occurs, the applied rotation amplitude is set to zero to produce an error term of zero. Therefore, transition density must be accounted for by the tracking loop equations.

Figure 6:
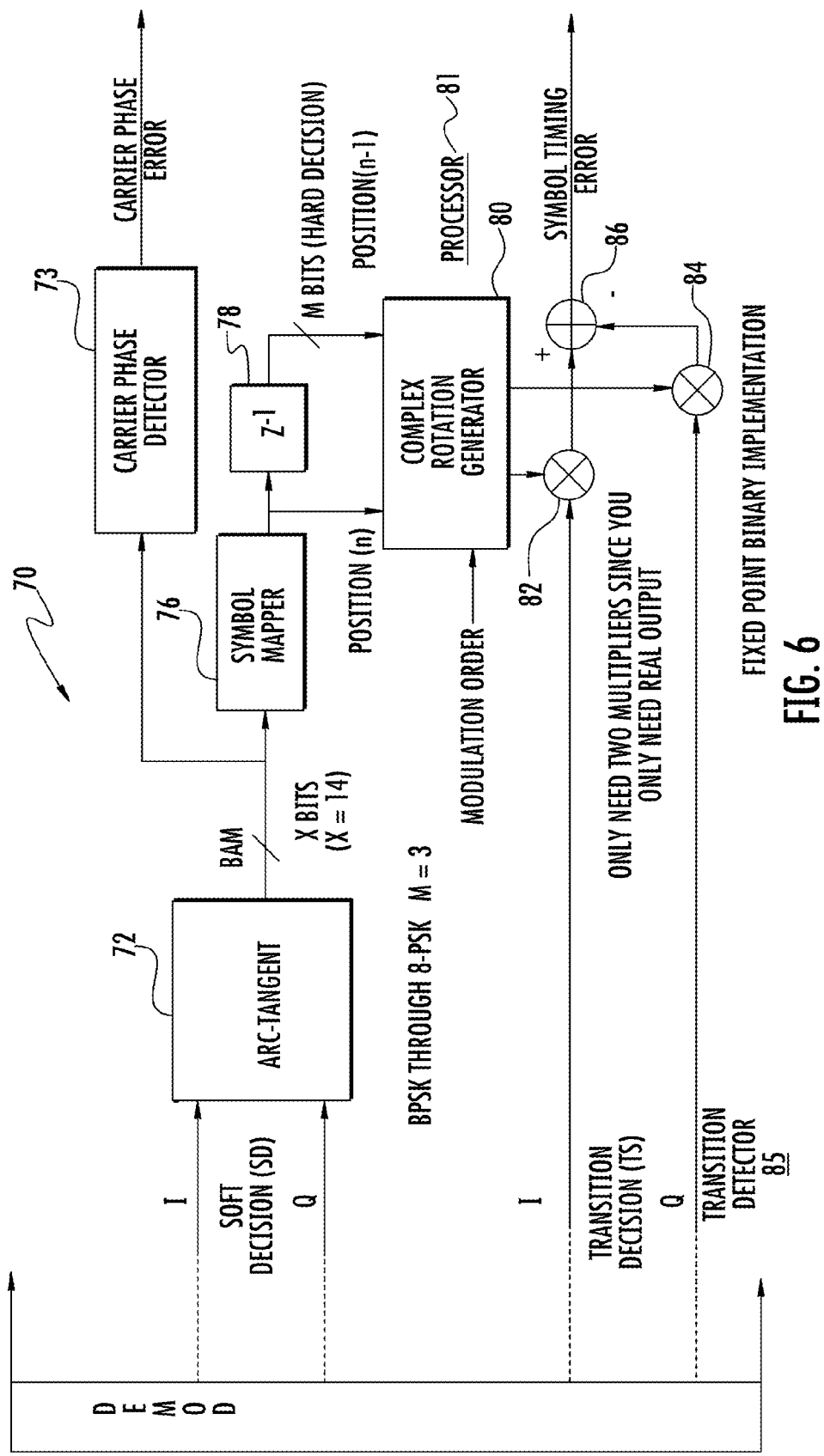
FIG. 6 is a block diagram showing a fixed point binary implementation of a circuit that is used to detect the symbol timing error for a higher order modulation using a trajectory mid-point rotation in accordance with a non-limiting example.

FIG. 6 illustrates a representation of a bit phase detector 70 as a fixed point binary circuit that has a phase detector function 70 as part of a receiver for a communications device and includes numerous modules/circuits, including an arc tangent (ArcTan) circuit 72 and a carrier phase detector 73 that detects the carrier phase error. The Binary Angular Measurement (BAM) is output from the ArcTan circuit to a symbol mapper 76 followed by a delay 78 with M bits as a hard decision fed into a complex rotation generator 80 as part of the overall processor 81. M is a function of the modulation order. The rotation calculation can be performed in real time or pre-computed and put in a lookup table. The I and Q Transition Decision (TD) from a transition detector 85 is fed into I and Q mixers/multipliers 82, 84 and then combined 86 to produce the real part of the complex multiplication which provides the symbol timing error.

In the fixed point binary circuit example shown in FIG. 6, the position descriptors only require 3 bits of information to reach 8-PSK. They could be constellation hard decisions or the BAM Most Significant Bits (MSB). An actual circuit that was built and tested used the 3 MSBs of the BAM angle so the Symbol Mapper circuit 76 strips off the 3 MSBs of the BAM angle. These hard decisions can be provided by numerous methods such as Log Likely hood or linear slicing, but for this non-limiting example, the upper bits of the BAM angle are used. In this case, to go from first order (BPSK) to third order (8-PSK) in the same design, the complex rotation can be evaluated based on the modulation order and the delta position of the hard decision of the constellation on time samples. In this application, gray coded constellation hard decisions could be used but typically would not provide any advantage for this method. In the Rotation Generator 80 the relationship between the 3 bit hard decisions and the rotational angle are computed based on the constellation definitions. In the actual hardware, gain and rotation are evaluated for all 64 possible combinations for all modulations and are placed in a look-up-table (LUT).

The I/Q phase represents a symbol coordinate in the complex plane and corresponds to a location in the modulation constellation diagram. The arc/tangent circuit calculates the phase error and has the look-up table for the carrier tracking loop. The diagram as shown in FIG. 6 represents the signal coordinates in the complex plane. The existing design of the carrier tracking loop is leveraged. The Carrier Phase Detector circuit is used to calculate the phase error between the received value and the nearest common decoded symbol.

Figure 7:
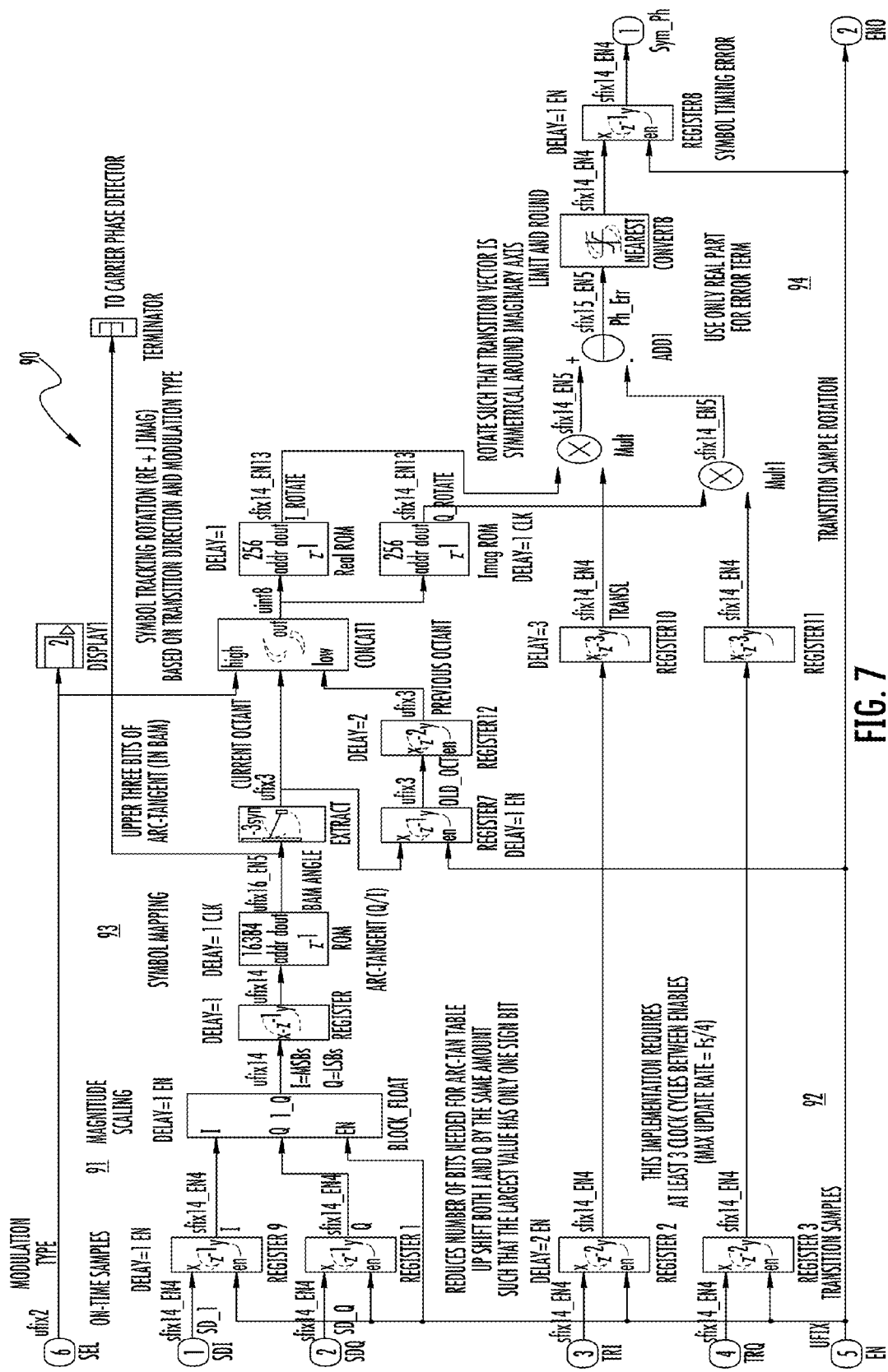
FIG. 7 is a block diagram showing an example of a circuit as formed from VHDL (VHSIC hardware density language) as a logic circuit that is used to detect the symbol timing error similar to the circuit shown in FIG. 6.
Figure 8A:
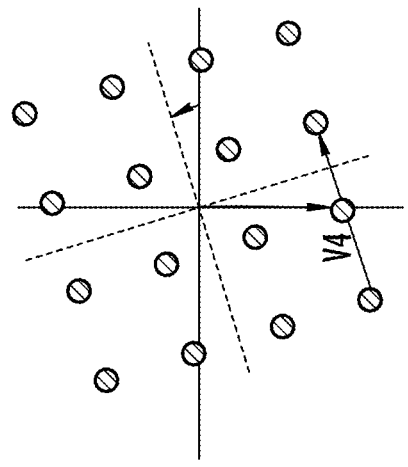
FIGS. 8A through 8D are examples of constellation phase diagrams for a 16-QAM constellation with different rotations in accordance with a non-limiting example.
Figure 8B:
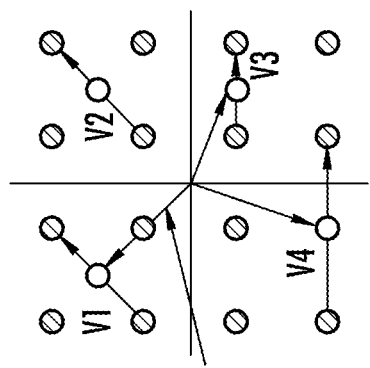
Figure 8C:
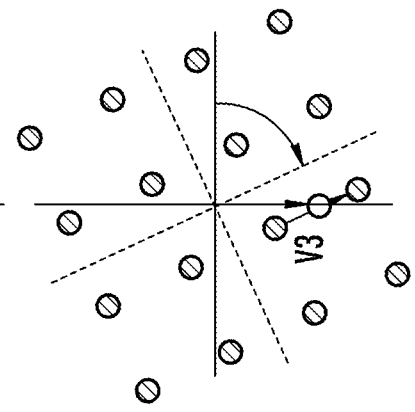
Figure 8D:
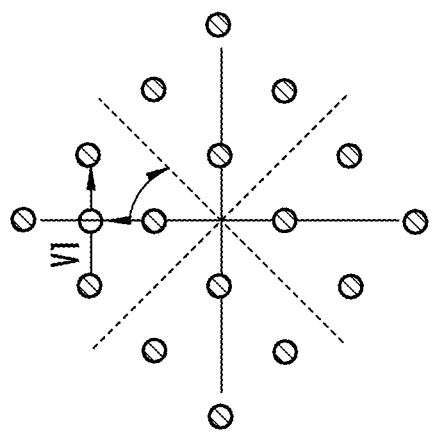

FIG. 7 shows a Simulink fixed point model 90 for a detector in accordance with a non-limiting example. This circuit is a transition midpoint rotator timing detector with an embedded carrier phase detector for continuous wave (CW) through 8-BPSK. As indicated, various on-time samples 91 and transition samples 92 are processed together with magnitude scaling and symbol mapping. This circuit reduces the number of bits required for the ArcTan table and there is an up shift with both I and Q by the same amount such that the largest value has only one sign bit. Symbol mapping 93 includes the ArcTan for Q/I. The upper three bits of the ArcTan in the BAM are processed and symbol tracking rotation is based on transition direction and modulation type. There is a transition sample rotation 94 such that the transition vector is symmetrical around the imaginary axis. At least three clock cycles are required between enables in this particular implementation to reduce logic but other implementations with more pipelining could be made to run at full rate. It still only uses two samples per symbol and therefore in this example six clock cycles per symbol.

For CW, no rotation is needed since there is no timing information so that entire part of the Look Up Table (LUT) is populated with zero. For BPSK, only 0 and 180 degree rotations need be used since the BPSK constellation points are already parallel to the real axis. This same technique can be applied to rectangular QAM and other modulations as well. An example is shown in FIGS. 8A through 8D as the 16-QAM constellation.

FIGS. 8A-8D are graphs for an example of 16 QAM modulation showing the On-Time (n−1) and On-Time (n) and Transition (n) with a Nth rotation vector as a function of OT (n−1), OT (n) and TR (n), which requires only two samples per symbol regardless of the modulation order.

Since the V2 Vector is radial from the origin and not symmetrical to the origin, then it would be weighted the same as no transition and would have to be accounted for in the loop equation transition density. The other three vectors are rotated (FIGS. 8B-8D) such that the vectors from the origin to the mid-point of the idea trajectory (Mid-Point Vector) lie on the imaginary axis and the trajectory is from left to right. In V1, V3 and V4 the real part of the resulting vector is all that is needed for the timing error terms since it has a projection on the real axis. This technique can be applied to all the other possible trajectory vectors until the LUT can be populated with the appropriate complex rotation values. The gain of the complex rotation weight can also be adjusted such that the timing error term is normalized. The gain adjustment may or may not be advisable since the smaller trajectories also have a higher incidence of decision direction errors. FIG. 8E is a graph of the transition (n) and On-Time (n−1) and On-Time (n) function of the Nth rotation vector.

The TMDTD leverages already existing demodulator information to determine the timing transition error term for the symbol tracking loop for any number of modulations even if the transition vectors are not symmetrical about the origin. It only requires two samples per symbol similar to lower order modulation. First developed and tested for 8-ary PSK, it can be extended to include many other modulations as well. One limitation is that transitions oriented radially outward or inward toward the origin that do not cross symmetrically through the origin (such as V2 in the 16 QAM case) would require more manipulation than simple rotation and gain. It could be accommodated by additional mathematical manipulation, but in this non-limiting example, it is treated the same as no transition.

Figure 9A:
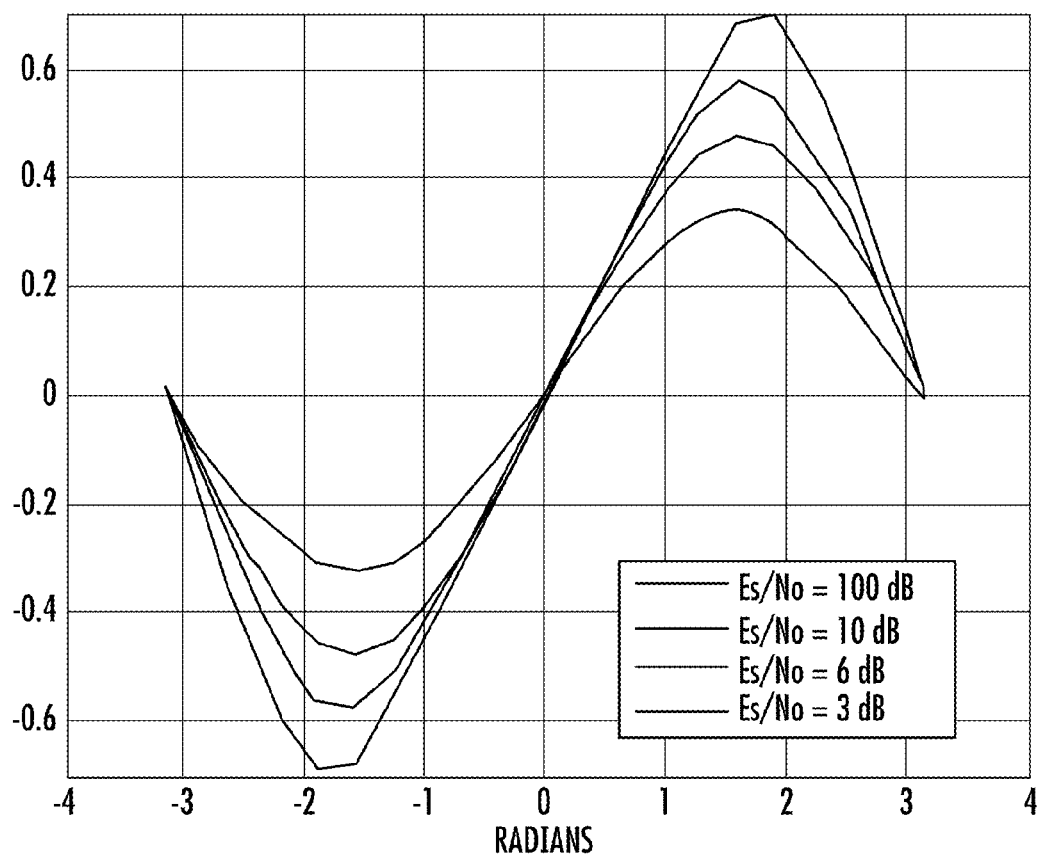
FIGS. 9A through 9C are graphs showing typical detector performance based on this invention and BPSK symbol timing detector results are shown in FIG. 9A, QPSK symbol timing detector results in FIG. 9B, and 8-PSK symbol timing detector results in FIG. 9C.
Figure 9B:
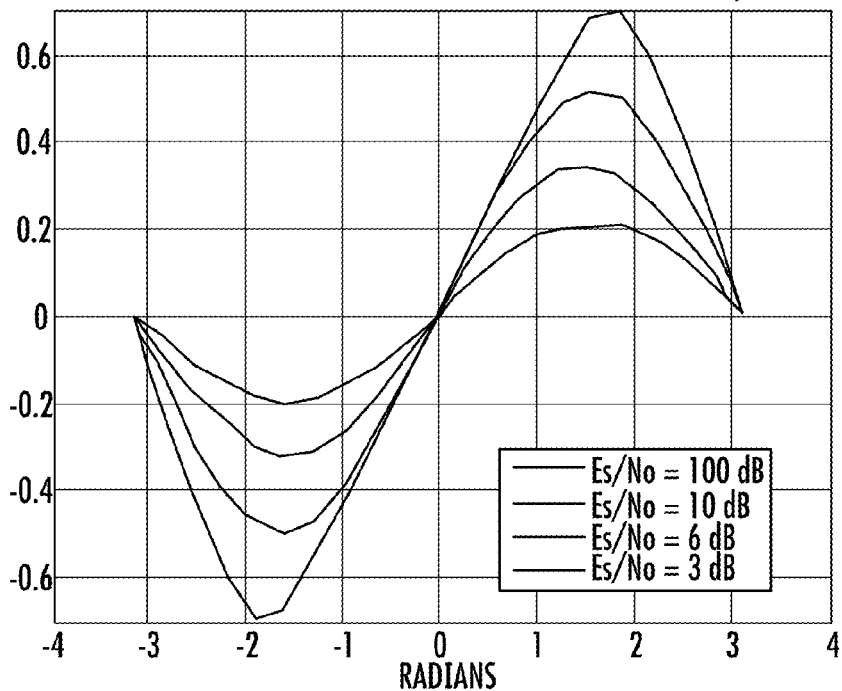
Figure 9C:
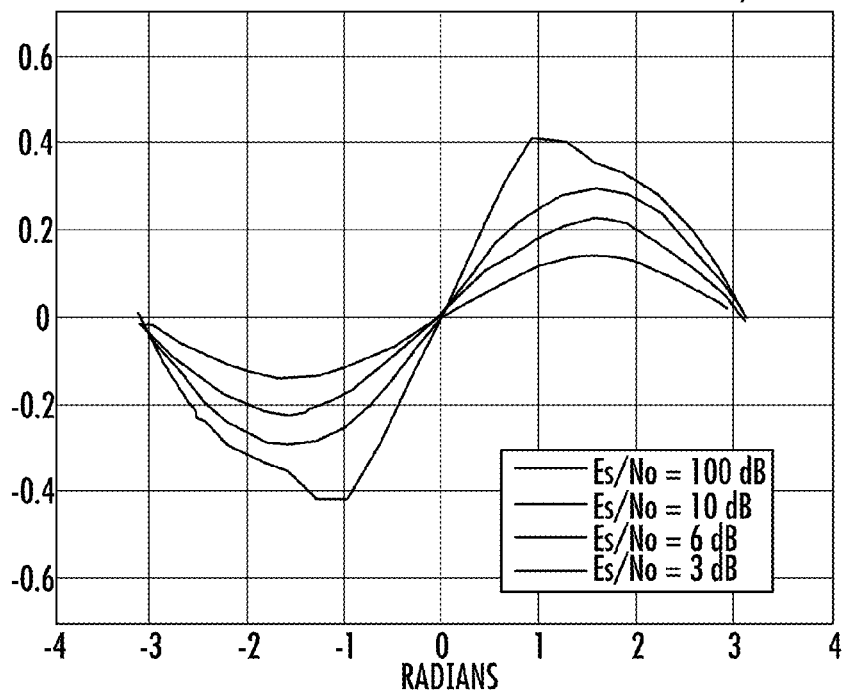

The graphs in FIGS. 9A-9C show the typical detector performance for basic PSK Modulations at various Es/No settings. The curves were generated using random data and no special weighting gain based on trajectory vector length, so they have been scaled only based on the transition density.

FIG. 9A shows a graph of the BPSK symbol timing detector while FIG. 9B shows a graph of the QPSK symbol timing detector. FIG. 9C shows a graph of the 8-PSK symbol timing detector.

For purposes of description, some background information on an exemplary wireless, mobile radio communications system that includes ad-hoc capability and can be modified for use is set forth. This example of a communications system that can be used and modified for use with the present invention is now set forth with regard to FIGS. 10-12.

An example of a radio that could be used with such system and method is the software defined Falcon™ III Manpack radio manufactured and sold by Harris Corporation of Melbourne, Fla. This type of radio can support multiple bandwidths from 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification. The SCA is an open architecture framework that specifies how hardware and software components are to interoperate so that different manufacturers and developers can readily integrate the respective components into a single device.

Figure 10:
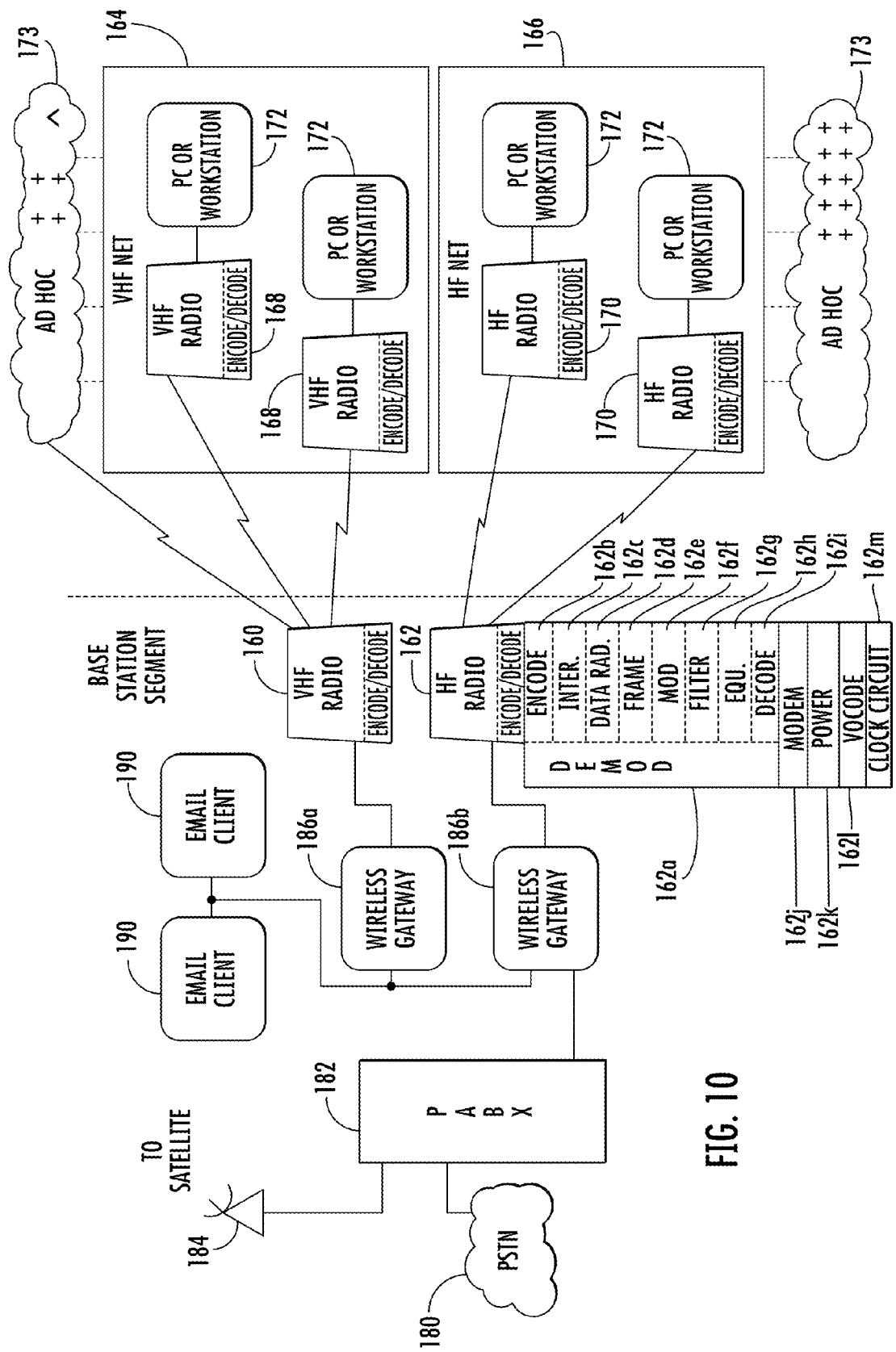
FIG. 10 is a block diagram of an example of a communication system showing a number of communications devices and other communications components that can be used in accordance with a non-limiting example.

For purposes of description only, a brief description of an example of a communications system that includes communications devices is described relative to the example shown in FIG. 10. This high-level block diagram of a communications system includes a base station segment and wireless message terminals that could be modified for use with the present invention. The base station segment includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168, 170. Ad-hoc communication networks 173 are inter-operative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 162a and appropriate convolutional encoder circuit 162b, block interleaver 162c, data randomizer circuit 162d, data and framing circuit 162e, modulation circuit 162f, matched filter circuit 162g, block or symbol equalizer circuit 162h with an appropriate clamping device, deinterleaver and decoder circuit 162i modem 162j, and power adaptation circuit 162k as non-limiting examples. A vocoder circuit 162l can incorporate the decode and encode functions and a conversion unit could be a combination of the various circuits as described or a separate circuit. A clock circuit 162m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 180, which connects to a PABX 182. A satellite interface 184, such as a satellite ground station, connects to the PABX 182, which connects to processors forming wireless gateways 186a, 186b. These interconnect to the VHF radio 160 or HF radio 162, respectively. The processors are connected through a local area network to the PABX 182 and e-mail clients 190. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, and of course, preferably with the third-generation interoperability standard: STANAG-4538. An interoperability standard FED-STD-1052, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066. It is also possible to use a fixed, non-adaptive data rate as high as 19,200 or higher bps with a radio set to ISB mode and an HF modem set to a fixed data rate. It is possible to use code combining techniques and ARQ.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device, comprising:
    an input configured to receive a communications signal having in-phase (I) and Quadrature (Q) signal components;
    a bit synchronization circuit operable to receive the communications signal and detect the symbol timing error in the communications signal, and comprising,
        a symbol mapper circuit configured to receive I and Q signal components and determine transition samples of vectors within the signal constellation as constellation on-time samples; and
        a rotation generator circuit coupled to the symbol mapper circuit and configured to rotate the trajectory of the transition samples at their midpoints based on hard decisions of the constellation on-time samples to determine the symbol timing error.

2. The communications device according to claim 1, and further comprising a hard decisions circuit configured to determine hard decisions within the bit synchronization circuit and configured to receive the communications signal and determine the binary angular measurement indicative of phase error.

3. The communications device according to claim 2, wherein the symbol mapper circuit is coupled to the hard decisions circuit to determine hard decisions of the constellation on-time samples.

4. The communications device according to claim 1, and further comprising a sampling circuit configured to sample the I and Q signal components and form transition samples.

5. The communications device according to claim 4, wherein the sampling circuit is configured to sample the I and Q signal components at two samples per symbol.

6. The communications device according to claim 1, wherein the rotation generator circuit is configured to rotate the trajectory of the transition samples based on the modulation order and delta position of the hard decision of the constellation on-time samples.

7. The communications device according to claim 1, and further comprising a processor configured to determine the symbol timing error using the real part of resulting vectors after rotating the trajectory of the transition samples.

8. A method of detecting the symbol timing error in a communications signal, comprising:
- receiving in-phase (I) and quadrature (Q) components of a communications signal within a bit synchronization loop;
- determining transition samples of vectors within the signal constellation as constellation on-time samples; and
- rotating the trajectory of the transition samples at their midpoints based on hard decisions of the constellation on-time samples to determine the symbol timing error.

9. The method according to claim 8, comprising receiving and processing the in-phase (I) and quadrature (Q) components of a communications signal within a hard decisions circuit.

10. The method according to claim 9, comprising determining the binary angular measurement of signals from the hard decisions circuit.

11. The method according to claim 10, comprising symbol mapping the signals from the hard decisions circuit.

12. The method according to claim 8, comprising sampling the I and Q signal components and forming transition samples.

13. The method according to claim 12, comprising sampling the I and Q signal components at two samples per symbol.

14. The method according to claim 12, comprising rotating the trajectory of the transition samples based on the modulation order and delta position of the hard decision of the constellation on-time samples.

15. The method according to claim 8, comprising determining the symbol timing error using the real part of resulting vectors after rotating the trajectory of the transition samples.

16. A method of detecting the symbol timing error in a communications signal, comprising:
- receiving in-phase (I) and quadrature (Q) components of a communications signal within a bit synchronization loop;
- determining the phase error of the I and Q signal components by processing the I and Q signal based on hard decisions;
- determining transition samples of vectors within the signal constellation as constellation on-time samples;
- rotating the trajectory of the transition samples at their midpoints based on hard decisions of the constellation on-time samples to determine the symbol timing error; and
- detecting the carrier phase error after determining the phase error.

17. The method according to claim 16, comprising determining the on-time hard decisions.

18. The method according to claim 17, comprising symbol mapping the hard decisions.

19. The method according to claim 16, comprising sampling the I and Q signal components and forming transition samples.

20. The method according to claim 19, comprising sampling the I and Q signal components at two samples per symbol.

21. The method according to claim 19, comprising rotating the trajectory of the transition samples based on the modulation order and delta position of the hard decision of the constellation on-time samples.

22. The method according to claim 16, comprising determining the symbol timing error using the real part of resulting vectors after rotating the trajectory of the transition samples.

23. A communications device, comprising:
- an input configured to receive a communications signal having in-phase (I) and Quadrature (Q) signal components;
- a bit synchronization circuit operable to receive the communications signal and detect the symbol timing error in the communications signal, and comprising,
  - a symbol mapper circuit configured to receive I and Q signal components and determine transition samples of vectors within the signal constellation;
- a rotation generator circuit coupled to the symbol mapper circuit and configured to rotate the trajectory of the transition samples at their midpoints to determine the symbol timing error; and
- a processor configured to determine the symbol timing error using the real part of resulting vectors after rotating the trajectory of the transition samples.

24. A method of detecting the symbol timing error in a communications signal, comprising:
- receiving in-phase (I) and quadrature (Q) components of a communications signal within a bit synchronization loop;
- determining transition samples of vectors within the signal constellation;
- rotating the trajectory of the transition samples at their midpoints; and
- determining the symbol timing error using the real part of resulting real part of resulting vectors after rotating the trajectory of the transition samples.

* * * * *